United States Patent [19]

Targa

[11] Patent Number: 5,570,655
[45] Date of Patent: Nov. 5, 1996

[54] DEVICE FOR CONTROLLING ANIMAL ACCESS TO A LOCATION

[76] Inventor: Anthony Targa, 340 Kingswood Road, Toronto, Ontario, Canada, M4E 3N9

[21] Appl. No.: 344,001

[22] Filed: Nov. 23, 1994

[30] Foreign Application Priority Data

Dec. 24, 1993 [CA] Canada .................................. 2112548

[51] Int. Cl.⁶ ...................................................... A01K 5/02
[52] U.S. Cl. ......................... 119/51.02; 119/63; 119/719; 119/908; 340/573
[58] Field of Search .................................. 119/51.02, 63, 119/719, 720, 721, 908, 905; 340/573

[56] References Cited

U.S. PATENT DOCUMENTS

| | | |
|---|---|---|
| 3,557,757 | 1/1971 | Brooks .................................. 119/51.02 |
| 3,897,753 | 8/1975 | Lee et al. . |
| 4,036,178 | 7/1977 | Lee et al. . |
| 4,162,683 | 7/1979 | Brooks .................................. 119/51.02 |
| 4,426,955 | 1/1984 | Monroe et al. ....................... 119/51.02 |
| 4,497,133 | 2/1985 | Blenkinsop . |
| 5,343,190 | 8/1994 | Rodgers ................................... 340/573 |

Primary Examiner—Todd E. Manahan

[57] ABSTRACT

Disclosed herein is a device for controlling animal access to a location, comprising a generator for generating a field and a sensor for sensing the presence of the field near the location. One of the generator and the sensor is removably secured on an animal. A buzzer or other output signal unit is responsive to the sensor for generating an output signal in the presence of the field, the output signal being of sufficient magnitude to deter the animal from the location. Also disclosed is a technique for deterring an animal from a location.

4 Claims, 1 Drawing Sheet

DEVICE FOR CONTROLLING ANIMAL ACCESS TO A LOCATION

BACKGROUND OF THE INVENTION

1. Field of the Invention

The invention relates to access control in general and particularly to access control for animals on a selective basis.

2. Description of the Related Art

In recent years, specialty pet food has become big business, with foods now tailored to almost any diet according to an animal's medical condition. While the specialty diets have improved the longevity and general health of the average domestic animal, problems arise in a household where more than one domestic animal is free to roam through the house. In this case, it becomes a problem if one of those animals is to eat the specialty diet while the other animal is not. Take for example an old house cat living together with a young house cat. The old house cat may be put on a low protein high energy diet to offset the effects of aging. A common sight in a situation such as this is to find a normally functioning older cat, benefiting from the virtues of the specialty diet together with a younger cat that has a ballooning weight gain due to the fact that its metabolism is not suited to the high energy diet.

The applicant is aware of but two references which deal specifically with this problem, namely U.S. Pat. Nos. 3,897,753 and 4,036,178, both to Lee et al. In this case, the system involves the use of a rather complex control system that generates a field around a food receptacle. The field is a barrier to any animal not wearing a special collar that is provided with a conductive portion that alters the field in some predetermined manner to signal to the system that the proper animal is near, thereby disabling a shock or other signal generating device. In the converse situation, the animal not wearing the collar ventures over to the receptacle and because the animal is not wearing the special collar, the shock mechanism is not disabled. Following his appetite, the animal reaches over the lip of the receptacle, makes contact with the metallic strip and receives a shock, thereby frightening the cat away from the receptacle.

While the system appears to have the ability to distinguish between those animals entitled to access and those who are not, the system is unreasonably complex, relying on the disruption of a field to disable the alarm mechanism. In addition, the fact that this system administers a shock to repel an animal may raise concerns with some people.

There remains a need for a simplified technique of controlling access of animals and one which is more humane than that of the prior art.

SUMMARY OF THE INVENTION

Briefly stated, the invention involves a device for controlling animal access to a location, comprising:

generating means for generating a field;

sensing means for sensing the presence of the field near the location;

means for releasably securing one of the generating means and the sensing means on an animal;

output signal means responsive to the sensing means for generating an output signal in the presence of the field, the output signal being of sufficient magnitude to deter the animal from the location.

In another aspect of the present invention, there is provided technique for deterring an animal from a location, comprising the steps of:

providing a field generating device;

providing a sensor to sense the presence of the field near the location;

releasably securing one of the field generating device and the sensor on an animal;

generating an output signal in response to the sensor, the signal being of sufficient magnitude to deter the animal from the location.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Referring to the figures, there is provided a device 10 for controlling animal access to a location, in this case a receptacle 12 to receive food, water or any other consumable to be given to the animal. As will be described, the device is provided with a generating means for generating a magnetic field in the form of a magnet 14a and a means for releasably securing the magnet 14a on an animal, such as a harness in the form of a collar 14. A sensing means is also provided for sensing the presence of the field near the receptacle and an output warning signal means is provided to generate an output signal in the presence of the magnetic field.

Figure 3:
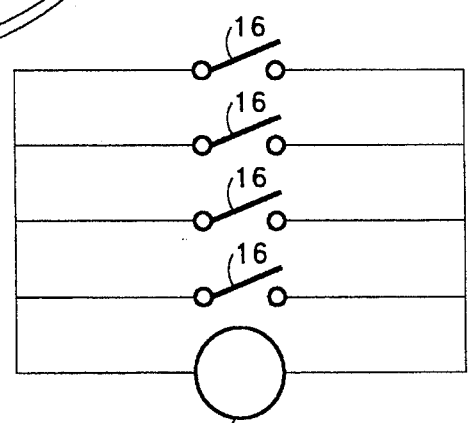
FIG. 3 is a schematic view of one aspect of the device illustrated in FIG. 1.

The receptacle has an opening with a perimeter 12a in which is located a number of sensors in the form of magnetic reed switches 16. As shown in FIG. 3, the switches 16 are joined in parallel with an output signal device 18. Preferably, the output signal device is a audio output signal device such as an alarm.

The collar functions to releasably secure the magnet 14a on an animal which is undesirable. For example, the animal may be a cat, and the collar is dimensioned to fit comfortably around the neck of the cat and the magnet is selected with sufficient strength to activate at least one of the reed switches while not interfering with the mobility of the cat.

Figure 1:
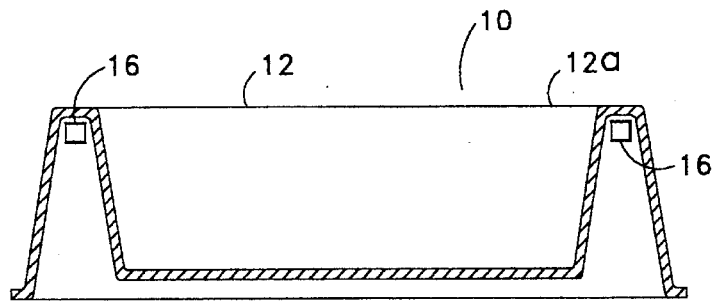
FIG. 1 is a sectional view of a device for controlling animal access to a location.
Figure 4:
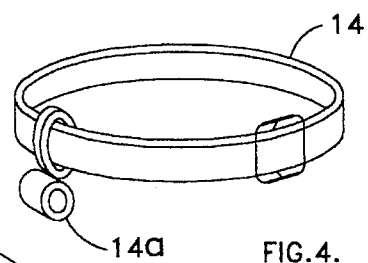
FIG. 4 is a perspective view of an animal harness used in connection with the device illustrated in FIG. 1.
Figure 2:
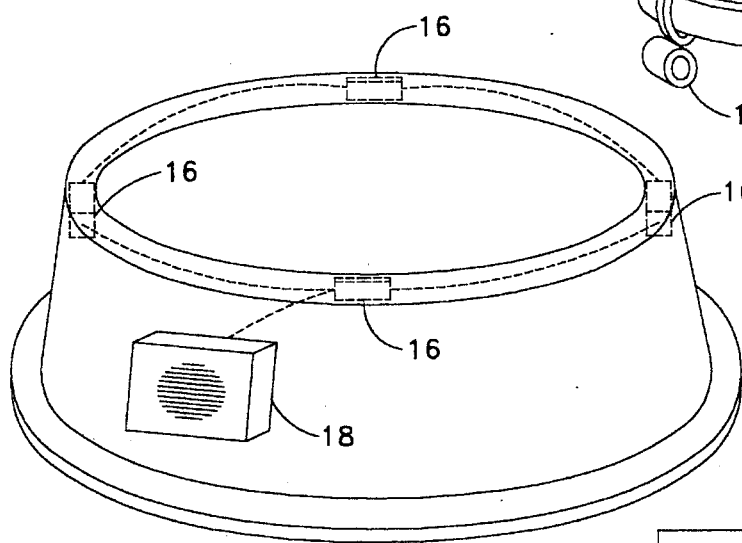
FIG. 2 is a perspective view of the device illustrated in FIG. 1.

Enough magnetic reed switches are provided around the perimeter to provide the system with sufficient sensitivity to the approaching magnet, for example four equidistant magnetic reed switches as shown in FIG. 2. Thus, it can be seen that the field generating means, in this case the magnet, is mounted on the animal while the sensor, in this case the magnetic reed switches, is positioned separate from the animal and is arranged so that the sensor senses the field as the animal approaches the location in question as will be described.

In use, the collar 14 is mounted on the undesirable one or more of a set of cats in a house. The receptacle is then filled with the proper allotment of special diet cat food for the desired cat. In this case, the desired cat is free to approach the receptacle and, since it is not wearing the magnet, will not cause any one of the magnetic reed switches to activate.

On the other hand, if the undesirable cat approaches the receptacle, the magnet on its collar will cause one of the magnetic reed switches to activate, thereby activating the signal device, thereby emitting a loud noise such as would be generated by a alarm, thus frightening the cat.

If desired, this system can be implemented for any animal such as a dog, in which case, the receptacle and the magnet will be arranged to complement the physique of the dog. In addition, the signal device may emit a bright blinking strobe light or some other kind of signal to frighten the animal.

While the above embodiment shows the use of a magnet, there may be other ways to generate a magnetic field. Other fields including electromagnetic fields, such as radio and light frequencies, may be generated, provided that the sensor is responsive to the field chosen. Other ways and means to sense the presence of the field may also be used such as proximity switches. Other receptacles may also be appropriate provided that they are equipped with a suitable opening.

The magnetic reed switches are wired in parallel and in spaced locations along the perimeter of the receptacle so that the alarm will be a activated regardless of the approach the animal takes toward the receptacle. Alternatively, it may be desirable to have just one magnetic reed switch on one location on the receptacle. In this case, the other regions of the perimeter should be provided with some other form of barrier. Thus, it will be seen that the use of the magnetic reed switches serves to inhibit the output signal means during periods when said field is not sensed by preventing power from flowing thereto through one open reed switch or, as in the case of the above embodiment, through the simultaneous open condition of all of the parallel connected reed switches.

Alternatively, the collar may be outfitted with a sensing device such as the magnetic reed switch and an output signal generating device and the receptacle provided with a suitably sized magnet to activate the reed switch. However, this arrangement would likely require that the magnetic field be tailored to activate the sensing device while not causing difficulties for other approaching animals. In addition, the sensing device should be configured to take into account other magnet fields that may be present in the animals domain.

While the discussion herein above has been restricted to an animal receptacle, this system could equally be used for controlling access to other things such as pet doors and the like.

I claim:

1. A device for controlling animal access to a location, comprising:

generating means for generating a field;

sensing means for sensing the presence of said field near said location;

means for releasably securing one of said generating means and said sensing means on an animal;

output signal means responsive to said sensing means for generating an output signal in the presence of said field, said output signal being of sufficient magnitude to deter said animal from said location, wherein said generating means includes a magnet and said means for sensing means includes a plurality of magnetic reed switches wired in parallel, said device further comprising a receptacle having an opening, said magnetic reed switches being located adjacent said opening.

2. A device for controlling animal access to a location, comprising:

generating means for generating a field;

sensing means for sensing the presence of said field near said location;

means for releasably securing one of said generating means and said sensing means on an animal;

output signal means responsive to said sensing means for generating an output signal in the presence of said field, said output signal being of sufficient magnitude to deter said animal from said location, wherein said generating means includes a magnet and said means for sensing means includes a plurality of magnetic reed switches wired in parallel, said device further comprising a receptacle having an opening, said magnetic reed switches being located adjacent said opening and wherein said output signal means is an alarm.

3. A technique for deterring an animal from a location, comprising the steps of:

providing a field generating device;

providing a sensor to sense the presence of said field near said location;

releasably securing one of said field generating device and said sensor on an animal;

generating an output signal in response to said sensor, said signal being of sufficient magnitude to deter said animal from said location, wherein said step of providing a field generating device includes the step of providing a magnet;

said technique further comprising the steps of:

providing a receptacle;

positioning said receptacle in said location, wherein said receptacle has an opening, said step of providing a sensor includes the step of:

installing at least one magnetic reed switch near said opening to sense said animal approaching said receptacle.

4. A technique for deterring an animal from a location, comprising the steps of:

providing a field generating device;

providing a sensor to sense the presence of said field near said location;

releasably securing one of said field generating device and said sensor on an animal;

generating an output signal in response to said sensor, said signal being of sufficient magnitude to deter said animal from said location, wherein said step of providing a field generating device includes the step of providing a magnet and said receptacle includes a perimeter, said step of providing a sensor includes the step of:

installing a number of magnetic reed switches on said perimeter to sense said animal approaching said receptacle.

* * * * *